US006333835B1

(12) United States Patent
Kang et al.

(10) Patent No.: US 6,333,835 B1

(45) Date of Patent: Dec. 25, 2001

(54) STEP PAD AIR BEARING FOR LOAD/ UNLOAD MECHANISM

(75) Inventors: Soo-Choon Kang; Sanford Anthony Bolasna; Oscar Jaime Ruiz, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,039

(22) Filed: Aug. 23, 1999

(51) Int. Cl.[7] .................................................... G11B 17/32

(52) U.S. Cl. .......................................................... 360/235.4

(58) Field of Search ............................. 360/236.2–236.9, 360/234.3, 234.9, 235.4, 235.9, 236.1

(56) References Cited

U.S. PATENT DOCUMENTS 5,508,862 * 4/1996 Lazzari et al. .................... 360/236.4
5,721,650 * 2/1998 Crane et al. ...................... 360/236.3
5,737,151 * 4/1998 Bolasna et al. ................... 360/236.8
5,754,367 * 5/1998 Chang et al. ..................... 360/235.6
5,768,053 * 6/1998 Yamanaka et al. ............... 360/236.8
6,021,020 * 2/2000 Itoh et al. ......................... 360/236.1
6,137,656 * 10/2000 Levi et al. ........................ 360/235.4
6,144,528 * 11/2000 Anay-Dufresne et al. ....... 360/235.4

* cited by examiner

*Primary Examiner*—William Klimowicz
*Assistant Examiner*—Tianjie Chen
(74) *Attorney, Agent, or Firm*—Robert B. Martin; Bracewell & Patterson, L.L.P.

(57) ABSTRACT

A recording head for a disk drive with a load/unload mechanism has an air bearing on one surface. The air bearing comprises a patterned set of three air bearing pads, at least five shallow pockets and one deep pocket. A narrow gap extends from the deep pocket and separates leading ones of the air bearing pads and shallow pockets from each other. The air bearing pads have unique, step-shaped geometry and the rear pad is virtually free of any shallow area. This configuration gives the air bearing superior performance characteristics over prior art designs with load/unload mechanisms.

25 Claims, 5 Drawing Sheets

19
31
35
38a
38c
37a
39c
39a
40
38b
39b
37b
41
38d
39e
37c
43
39d

STEP PAD AIR BEARING FOR LOAD/ UNLOAD MECHANISM

BACKGROUND OF THE INVENTION

1. Technical Field

This invention relates in general to magnetic recording devices and in particular to an air bearing surface on a magnetic read/write head that flies above magnetically recorded media at a relatively constant height.

2. Background Art

To successfully achieve file performance, a magnetic read/write head must fly steadily at a given fly height over the disk with minimal variations. Since the variations in fly height are dependent on the various sensitivities of the fly height to the process parameters as well as the variability of the parameters, a state-of-the-art air bearing surface (ABS) design technology and tight process control are mandatory to minimize such variations. Common dominant process parameters affecting fly height include gram load, pivot location, crown and etch depths.

Negative pressure bobsled slider (NPBS) air bearing designs are widely popular. These designs utilize relatively simple multi-step front and rear pads for design easiness, but show a fast take-off, small fly height variability, and good altitude loss. Conventional drives operate in contact stop-start (CSS) mode, where the heads are in contact with the disk as the drive is turned off. Since the contact between heads and disks is a major source of mechanical integration problems, a load/unload mechanism has been developed. The mechanism, which would lift the heads from the surface of the disks as the actuator travels beyond the outer diameter of the disk would completely prevent head-disk surface contact by parking the heads outside of the disk stack.

NPBS design for CSS mode requires a fast take-off performance to minimize any potential problem related to wear and contamination between heads and disks. This requirement needs enough rear pad area to build up the pressure at low speed. For higher operating speeds, rear pad size and geometry are directly related to the fly height sensitivity to crown and bigger pad size normally increases the fly height variation. However, take-off performance is not an issue for drives that employ load/unload mechanisms. Thus, the rear pad can be designed without regard to size limitations to improve ABS performance.

SUMMARY OF THE INVENTION

A recording head for a disk drive with a load/unload mechanism has an air bearing on one surface. The air bearing comprises a patterned set of three air bearing pads, at least five shallow pockets and one deep pocket. A narrow gap extends from the deep pocket and separates leading ones of the air bearing pads and shallow pockets from each other. The air bearing pads have unique, step-shaped geometry and the rear pad is virtually free of any shallow area. This configuration gives the air bearing superior performance characteristics over prior art designs with load/unload mechanisms.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
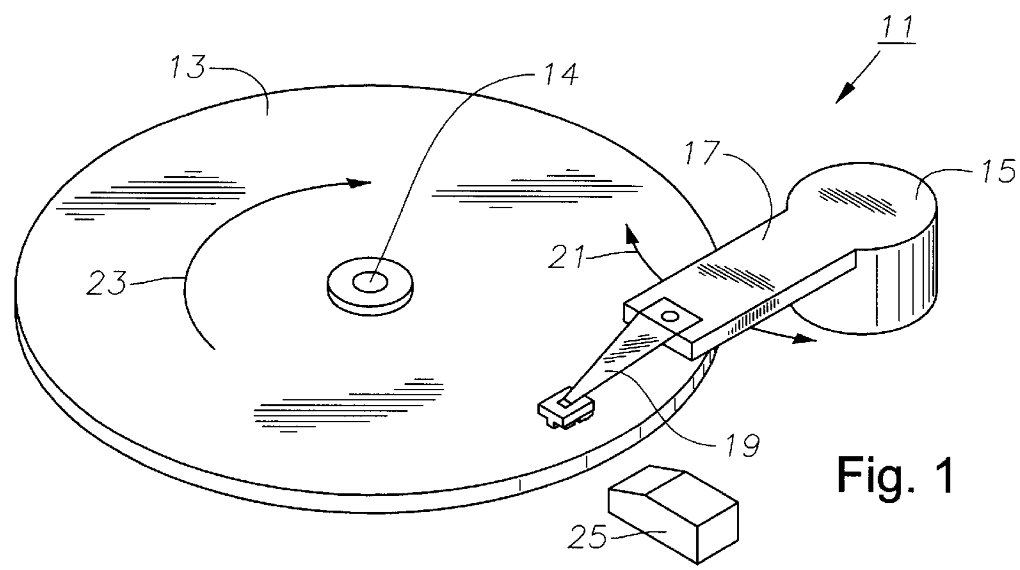
FIG. 1 is a schematic isometric drawing of a disk drive showing a disk and an actuator with a flying head assembly.

Referring to FIG. 1, a disk drive 11 for reading and writing information to the surface of a rotating, magnetic disk 13 having a large plurality of tracks is shown. Disk 13 is mounted on spindle 14 which is attached to a motor (not shown) that is operable to rotate disk 13. Drive 11 comprises an actuator 15 with a movable arm 17 and a suspension 19 on one end. Arm 17 and disk 13 move in the directions indicated by arrows 21, 23, respectively. Arm 17 provides the seek motion when changing tracks on disk 13. A load/ unload mechanism, such as ramp 25, is located adjacent to disk 13 for engaging actuator 15.

Figure 2:
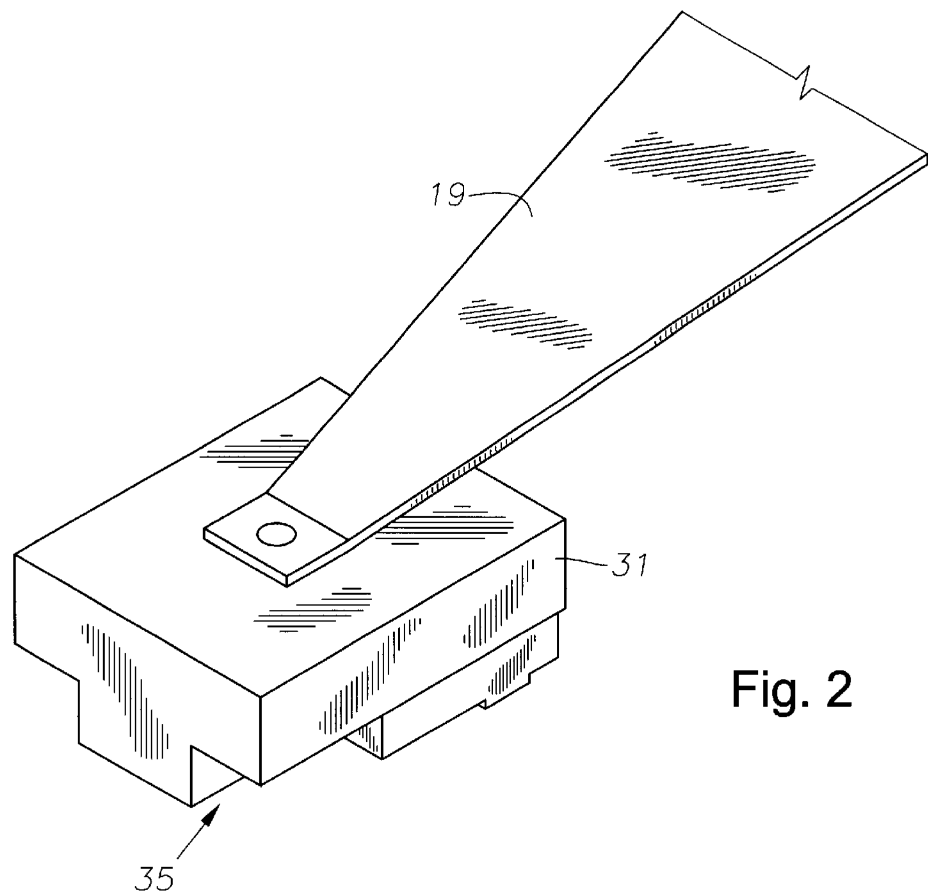
FIG. 2 is an enlarged isometric view of a first embodiment of a magnetic head on the flying head assembly of FIG. 1 and is constructed in accordance with the invention.

As shown in FIG. 2, a slider or flying head 31 is bonded to the end of suspension 19. In the embodiment shown, head 31 is pico size (approximately 1250×1000×300 microns) and formed from ceramic or intermetallic materials. Head 31 may also be nano size (approximately 2050×1600× 450 microns). Head 31 is pre-loaded against the surface of disk 13 (in the range two to ten grams) by suspension 19. Head 31 also supports a magnetic read/write element (not shown).

Figure 3:
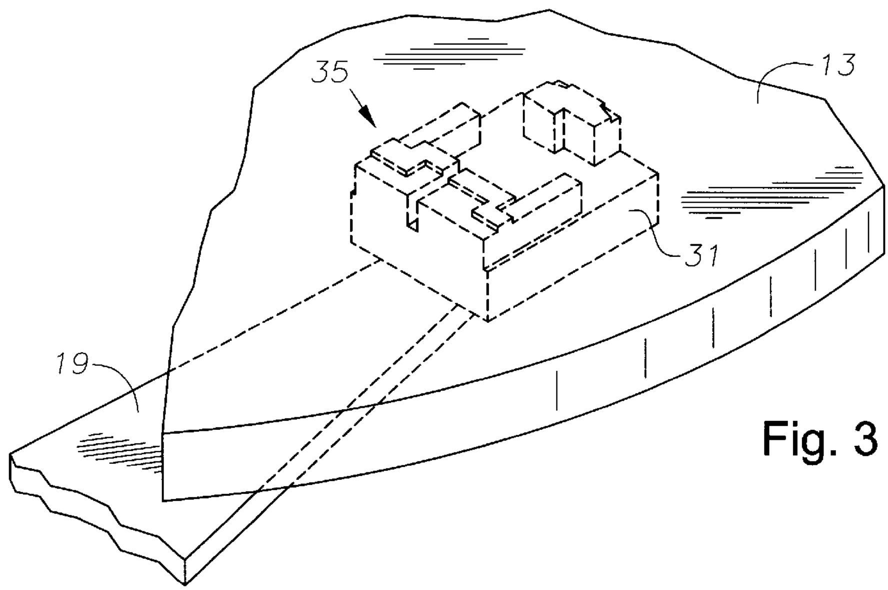
FIG. 3 is a schematic isometric drawing of the head of FIG. 2 inverted on a lower side of the disk of FIG. 1.
Figure 4:
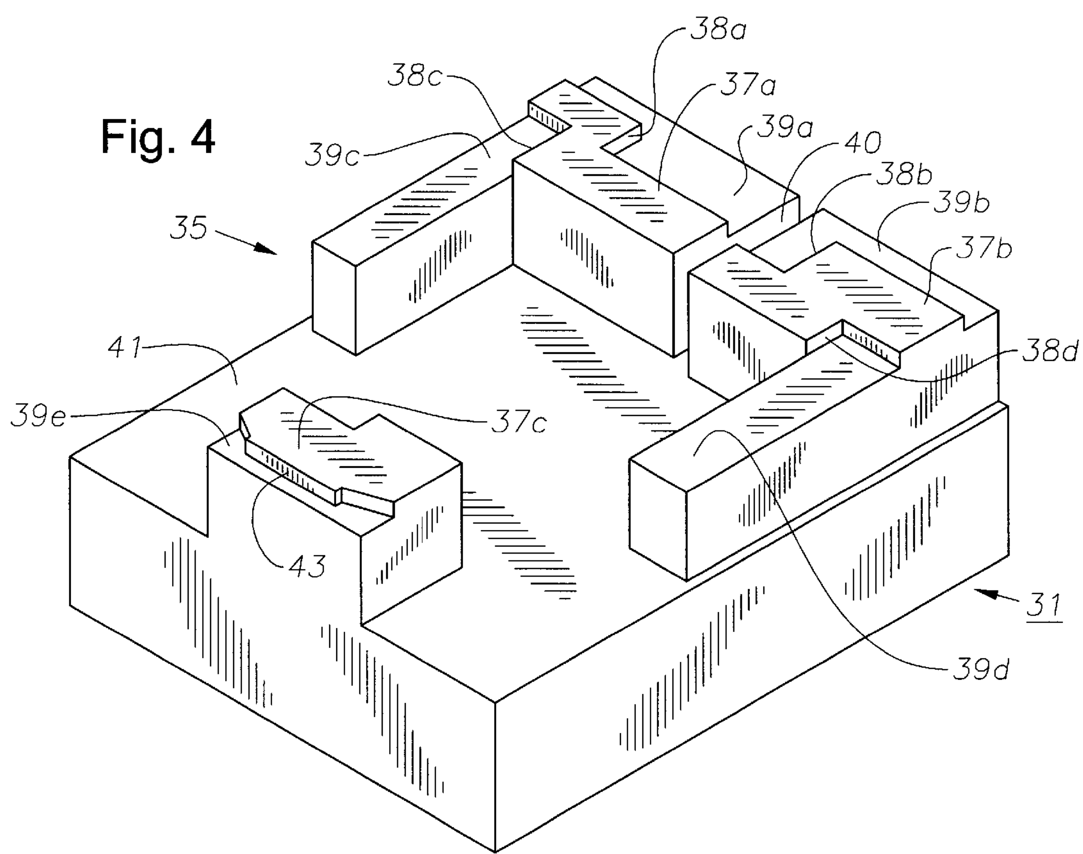
FIG. 4 is a bottom isometric view of the head of FIG. 2.
Figure 5:
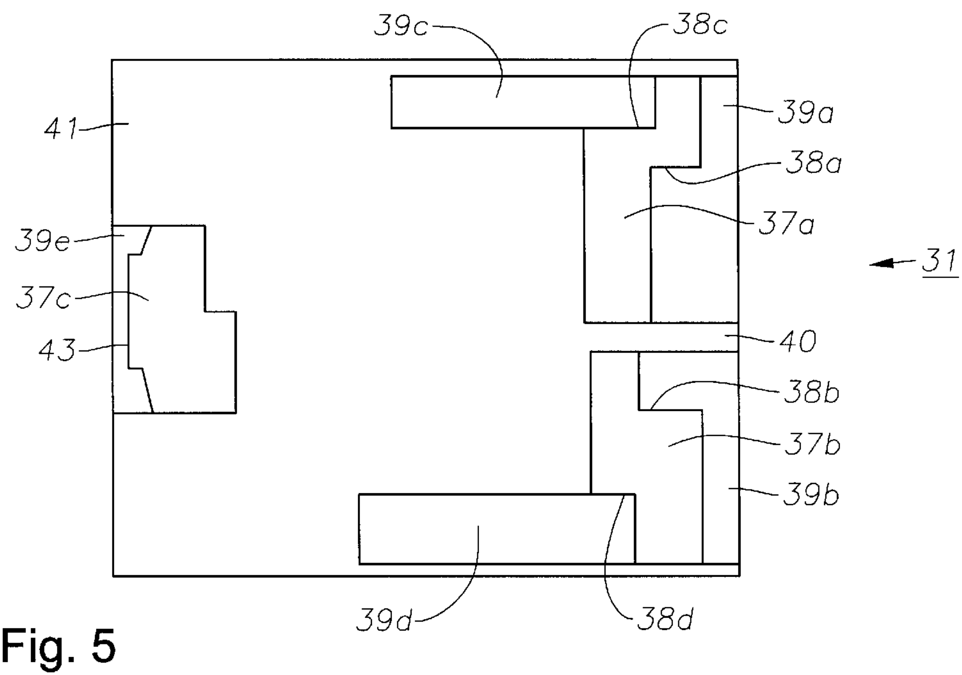
FIG. 5 is a bottom view of the head of FIG. 2.

As shown in FIGS. 3–5, the air bearing 35 of head 31 comprises a patterned set of elements, such as ABS pads 37 and pockets 39, 41 which are the basis of this invention. The pockets 39, 41 are manufactured using standard etching techniques such as reactive ion etching (RIE) and ion milling (IM). Common etch depths range from about 0.1 to 5 microns. The ABS pads 37, or portions of the air bearing 35 that have not been etched, are also called air bearing surfaces (ABS).

In this embodiment, head 31 has three ABS pads 37*a*–*c*, five shallow pockets 39*a*–*e* (approximately 0.18 to 0.28 microns beneath ABS 37), and a deep, surrounding pocket 41 (approximately 1.60 microns beneath ABS 37) that extends to portions of the leading, lateral, and trailing edges. The trailing edge 43 of air bearing 35 is defined by the rear edge of ABS 37*c*, which extends from pocket 39*e*.

Leading edge pockets 39*a*, *b* are generally L-shaped. Leading edge ABS pads 37*a* and 37*b* are generally step-shaped and have first notches 38*a*, 38*b*, respectively, formed in their leading edges. Notches 38*a*, 38*b* extend all the way to gap 40. A second set of notches 38*c* and 38*d* are formed in the trailing edge of pads 37*a*, 37*b*, respectively, and extend outward to the lateral side edges of head 31. Notches 38*a–d* are etched to the depth of the shallow pockets and form a part of shallow pockets 39*a–d,* respectively. Notches 38*a–d* provide pads 37*a,* 37*b* with its unique step shape. Leading edge shallow pockets 39*a,* 39*b* are positioned between the leading edge of head 31 and leading edge pads 37*a,* 37*b*. Pockets 39*c,* 39*d* are positioned behind pads 37*a,* 37*b* and parallel to the side edges of the head 31.

ABS 37*a, b* extend from between pockets 39*a–d* and pocket 41. ABS 37*a, b* and pockets 39*a–d* are preferably laterally offset from the lateral edges of head 31. ABS 37*a, b* are also offset from the leading edge by pockets 39*a, b,* respectively. Note that ABS 37*a* and pocket 39*a* are spaced apart from ABS 37*b* and pocket 39*b* by an off-center, rectangular gap 40 that extends longitudinally forward from pocket 41 all the way to the leading edge. Gap 40 has a lateral or transverse dimension that is narrower than those of ABS 37 and pockets 39, 41. Pockets 39*c, d* are substantially rectangular in shape.

ABS 37*c* extends from between pocket 39*e* and pocket 41. Each ABS 37*a, b* and pocket 39*e* have perimeters with eight sides, and ABS 37*c* has ten sides. Pockets 39*a, b* have six-sided perimeters. In a preferred embodiment, head 31 is pico size. Note that the elements of air bearing 35 are longitudinally and laterally asymmetric. It should be apparent that the shape, location and etching depths of the various elements on air bearing 35 may be readily varied and are not limited to the slider size nor dimensions suggested above.

There are several important parameters that measure the performance of head 31. Fly height is the separation between a point on the ABS 37 and disk 13, such as the center of the trailing edge 43 of air bearing 35 and the surface of disk 13. Pitch is the tilting of the flying slider in the longitudinal direction with respect to the plane of the disk 13. Roll is the tilting of the flying slider in the transversal direction with respect to the plane of the disk 13. Fly height, pitch, and roll are all dependent on parameters like ambient pressure, temperature, air viscosity, linear velocity (product of radius from center of disk 13 and disk angular velocity or rpm), skew angle (angle between the longitudinal axis of head 31 and the tangent to the current radius from the center of disk 13), pre-load (the force applied by suspension 19), suspension moments (moments applied in the pitch and roll directions by suspension 19), slider flatness, and the design of air bearing 35 itself (described in the previous paragraphs). The design of head 31 targets a velocity independent, fly height profile that remains flat across the radius of disk 13. The spacing between head 31 and disk 13 is completely described by fly height, together with its pitch and roll.

The performance of head 31 may also be measured in terms of sensitivities. The sensitivities of head 31 describe its change in fly height, pitch, or roll when another parameter that affects the fly height changes by one unit. For example, "sensitivity to pre-load" measures the decrease in fly height when the pre-load force is increased by one gram. "Sensitivity to slider flatness" is also an important parameter. The surfaces 37 of air bearing 35 are not perfectly flat since head 31 exhibits a longitudinal curvature or crown, a transversal curvature or camber, and a cross curvature or twist. Among these features, crown has the greatest effect on fly height.

In general, the parameters that affect fly height are associated with the suspension 19 (pre-load, location of the dimple with respect to the slider, and static attitudes in the pitch and roll directions), head 31 (flatness and size of ABS 37, etch depths, mask alignment, and rail width), and operating conditions (ambient temperature, pressure, viscosity, and velocity). It is desirable for head 31 to have low sensitivities since that implies that the departure of fly height from its desired target is small. Each parameter affecting fly height is described statistically by its mean and standard deviation. A tight distribution of values for a parameter around their mean implies that the spread or standard deviation is small.

For example, "fly height sigma" is a statistical estimator of the fly height variation of a group of heads 31. This parameter is proportional to the standard deviation of other parameters that affect fly height, and to the sensitivities of the design of air bearing 35. Thus, by designing head 31 to possess low sensitivities, and by ensuring that the manufacturing process is very repeatable, a tight distribution of fly heights is realized.

There are also a number of specific requirements for head 31 that must be met. Since disk 13 is not perfectly flat and exhibits waviness or curvature that affects fly height, it is desirable that head 31 responds consistently to changes in the curvature of disk 13. There are at least two disk curvatures of interest. One is in the tangential direction is related to the crown of the slider. Another is in the radial direction and is related to the camber of the slider. Because of the magnitude of the radial curvature near the rim of the disk (also called roll-off or ski jump), it is important for the head 31 to feature a low transversal curvature sensitivity. The flatness sensitivity of head 31 is important in this respect.

Another requirement for head 31 is low fly height and roll sigmas. The variability in fly height of head 31 must be consistent. In particular, the roll standard deviation must be small since it is the spacing between the trailing edge 43 of head 31 and disk 13 that controls the fly height. If trailing edge 43 is perfectly parallel to disk 13, the clearance is uniform. Any amount of roll creates an uneven clearance between the head 31 and disk 13.

As a related requirement, head 31 must have good load/unload performance. During operation, head 31 is loaded onto a spinning disk 13 and must establish its supportive air bearing to avoid contact with disk 13. Ideally, there will be no exposure to wear during the load/unload sequences.

Physical contact with disk 13 can be a disturbing event on the fly height as it causes head 31 to lose support and crash on disk 13. Therefore, a robust and stable response to contact is required.

Figure 6:
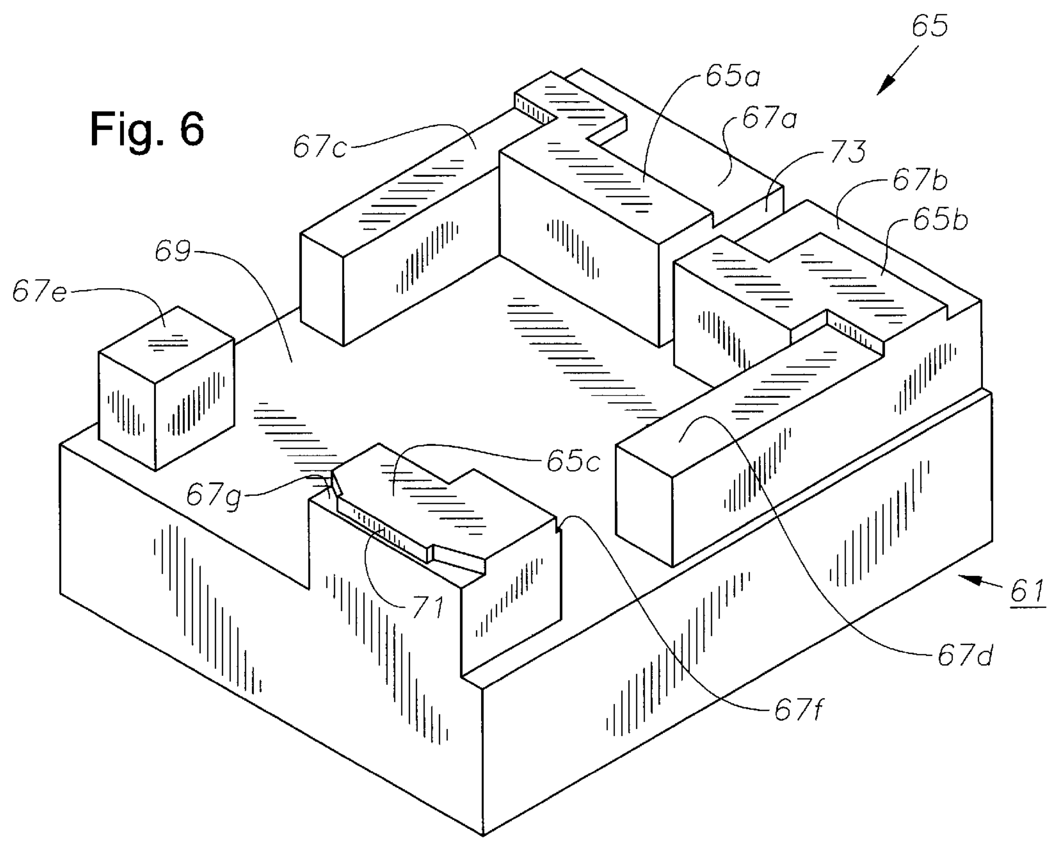
FIG. 6 is a bottom isometric view of a second embodiment of the head of FIG. 2.
Figure 7:
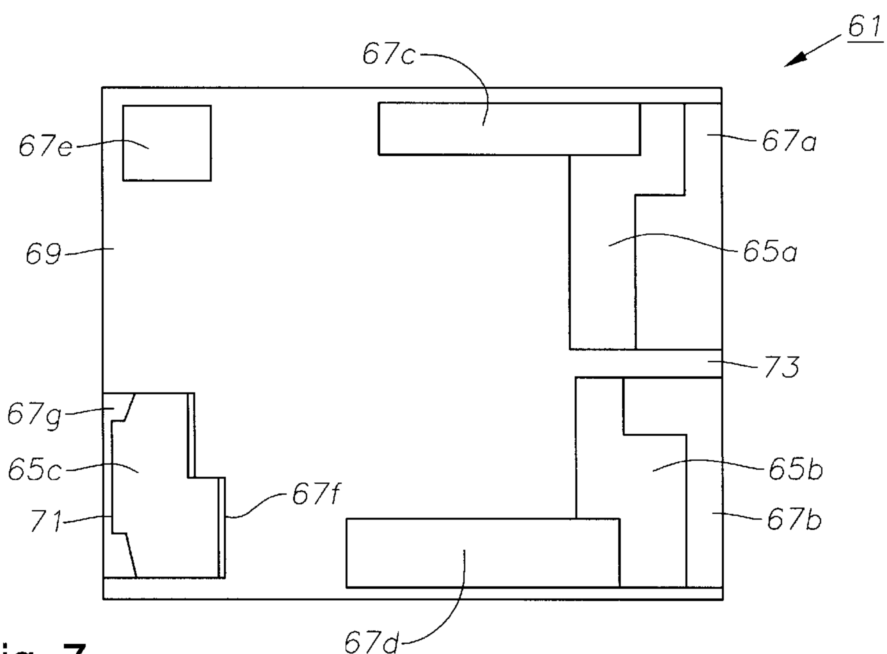
FIG. 7 is a bottom view of the head of FIG. 6.

Referring now to FIGS. 6 and 7, a second embodiment of the invention is shown as head 61. Head 61 is identical to head 31 except for the shape and size of the elements on its air bearing 65. Like head 31, head 61 has three ABS 65*a–c,* but it has seven shallow pockets 67*a–g* (approximately 0.18 to 0.28 microns beneath ABS 65), and one deep pocket 69 (approximately 1.60 microns beneath ABS 65). In the preferred embodiment, head 61 is also pico size.

The trailing edge 71 of air bearing 63 is defined by the rear edge of ABS 65*c,* which extends between narrow pockets 67*f* and 67*g*. ABS 65*a, b* and pockets 67*a, b* are generally L-shaped. ABS 65*a, b* extend from between pockets 67*a–d* and pocket 69. ABS 65*a, b* and pockets 67*a–d* are laterally offset from the lateral edges of head 63. ABS 65*a, b* are also offset from the leading edge by pockets 67*a, b,* respectively. ABS 65*a* and pocket 67*a* are spaced apart from ABS 65*b* and pocket 67*b* by an off-center, rectangular gap 73 that extends from pocket 69 all the way to the leading edge. Gap 73 is substantially equivalent to gap 40, described above. Pockets 67*c, d* are substantially rectangular in shape.

Pocket 67*e* is generally square in shape and located near but offset from the rear left corner of air bearing 63. Each ABS 65*a, b* and pockets 67*f, g* have perimeters with eight sides, and ABS 65*c* has ten sides. Pockets 67*a, b* have six-sided perimeters. Pockets 67*c–e* each have four sides. In a preferred embodiment, head 31 is nano size. The elements of air bearing 35 are longitudinally and laterally asymmetric. Again, it should be apparent that the shape, location and etching depths of the various elements on air bearing 63 may be readily varied and are not limited to the values described above.

Figure 8:
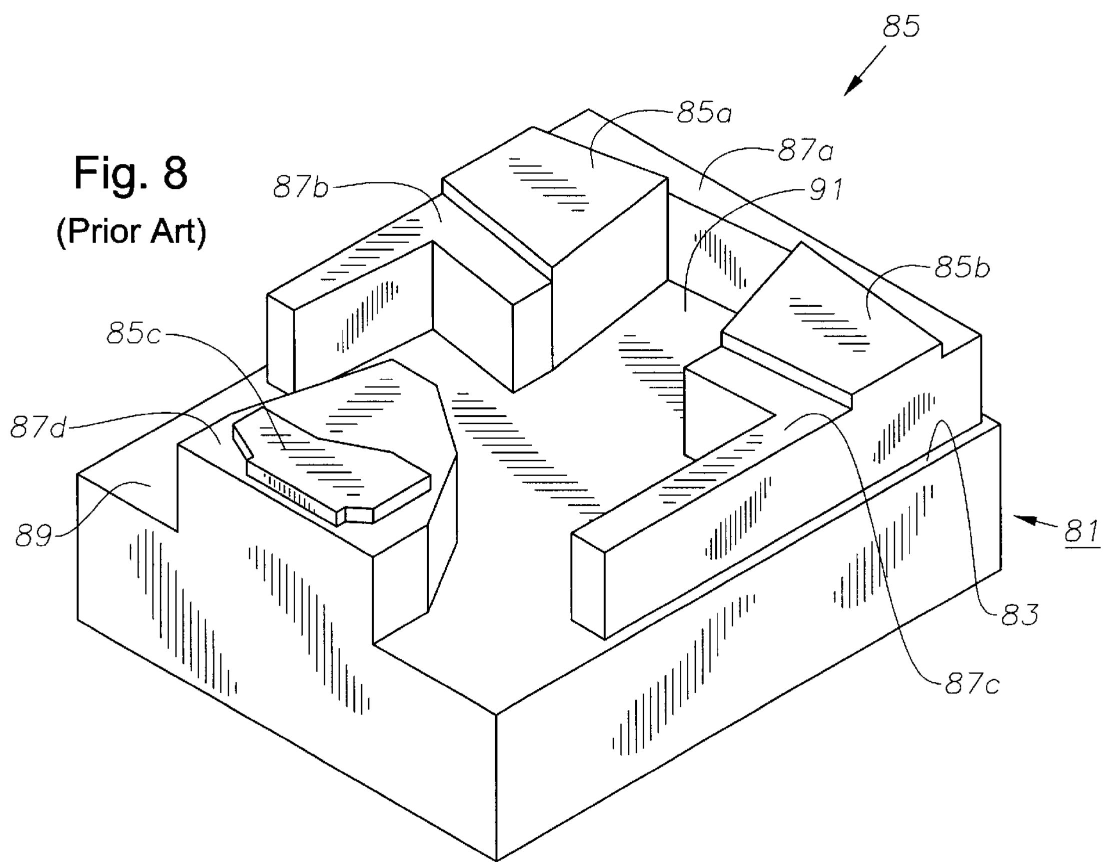
FIG. 8 is a bottom isometric view of a prior art flying head.
Figure 9:
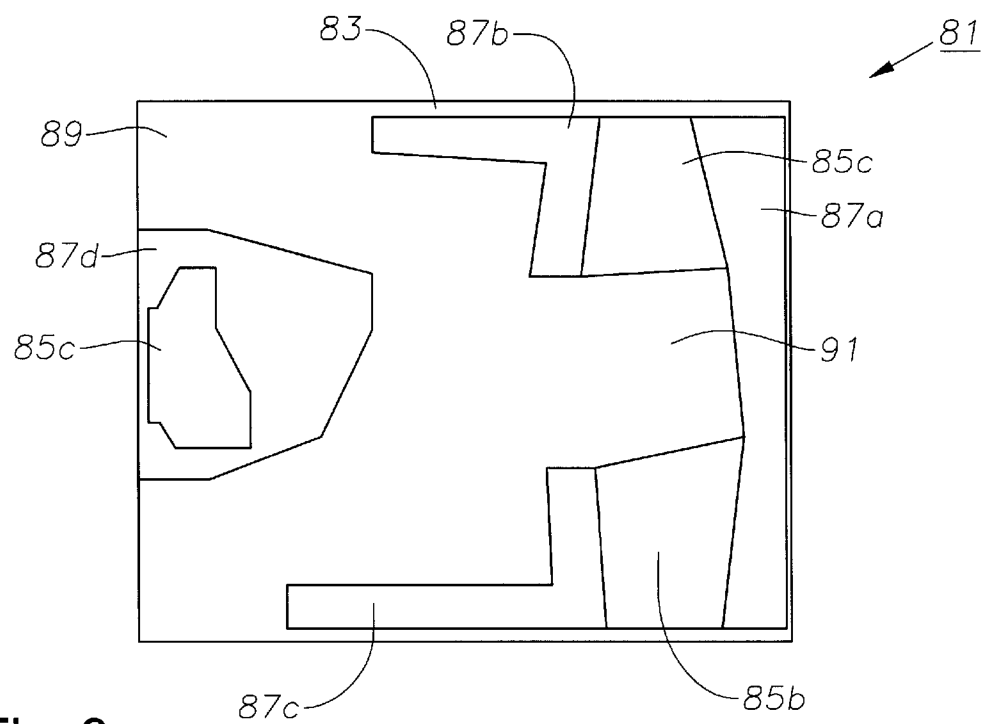
FIG. 9 is a bottom view of the head of FIG. 8.

Referring now to FIGS. 8 and 9, a prior art head 81 has an air bearing 83 with three ABS 85*a–c,* four shallow pockets 87*a–d* (approximately 0.18 to 0.28 microns beneath ABS 85), and one deep pocket 89 (approximately 1.6 to 1.8 microns beneath ABS 85). ABS 85*a, b* and pockets 87*a* are generally block-like shapes. ABS 85*a, b* extend from between pockets 87*a–c.* ABS 85*a, b* and pockets 87*a–c* are laterally offset from the lateral edges of head 83. ABS 85*a, b* are also offset from the leading edge by pocket 87*a*. ABS 85*a* and pocket 87*a* are spaced apart from ABS 85*b* and pocket 87*b* by a rectangular notch 91 that extends from pocket 89 to pocket 87*a*. Pockets 87*b, c* are substantially L-shaped. Polygonal pocket 87*d* is much larger than ABS 85*c* and abuts the rear edge of air bearing 83. ABS 85*a* is square, ABS 85*b* and pockets 87*a, b, c* are hexagonal, ABS 85*c* has eleven sides, and pockets 87*d* has seven sides. The elements of air bearing 85 are also longitudinally and laterally asymmetric.

Heads 31 and 61 have several features that make them readily distinguishable from the prior art head 81. The gaps 40, 73 that extend between the front ABS of heads 31, 61, respectively, all the way to their leading edges is unique. The rear shallow etched pockets 39*e* and 67*e,g* are much smaller in area than those of the prior art. In addition, the front ABS are L-shaped and the rear ABS has more surface area.

The following table describes the fly height sensitivity of head 31 and the prior art head 81 when their various parameters are changed by one unit.

Flying Height Sensitivity Table

| Parameter | Head 31 | Prior Art Head |
|---|---|---|
| Change in Fly Height with unit change in Crown (nm/nm) | 0.16–0.20 | 0.21–0.25 |
| Change in Fly Height with unit change in Shallow Etch Depth (nm/micron) | 70–90 | 190–210 |
| Change in Fly Height with unit change in Deep Etch Depth (nm/micron) | 4–15 | 6–20 |
| Change in Fly Height with unit change in pre-Load (nm/gram) | 8.5 | 7.5 |
| Fly Height sigma (nm) | 1.8–2.5 | 2.6–3.0 |

With head 31, several parameters show a significant decrease in flying height sensitivity when compared to head 81, including crown, etching depths and flying height sigma.

The invention has several advantages. The use of step-shaped front ABS pads that are separated by a gap extending to the leading edge of the air bearing significantly improves performance. The gap reduces suction force or negative load and helps reduce contact between the disk and the slider during loading and unloading. The shallow rear pocket area has been reduced and almost eliminated to improve fly height sensitivity to crown by about 20%, and to shallow etch depth by about 50%. This also produces an approximately 20% improvement in fly height sigma. The larger rear ABS improve crown measurability as well as process capability. The L-shaped ABS obtain flatter flying height profiles. Thus, the heads of the invention have low crown sensitivities, low fly height sigmas, and low sensitivities to pad wear. These heads also have good load/unload performance, and handle impacts with asperities very well. In addition, the heads can be pico or nano size.

While the invention has been shown or described in only some of its forms, it should be apparent to those skilled in the art that it is not so limited, but is susceptible to various changes without departing from the scope of the invention.

We claim:

1. A magnetic head for reading and writing to a surface of a rotating magnetic disk, comprising:

a base having a first side and an opposite second side, the first side having a leading edge, a trailing edge, and two lateral edges extending therebetween;

an air bearing formed on the first side of the base that is both longitudinally and laterally asymmetric; the air bearing comprising:

a plurality of air bearing pads extending therefrom having step-shaped leading edge pads and a trailing edge pad;

a plurality of shallow pockets formed in the air bearing at a first depth relative to the air bearing pads;

a deep pocket formed in the air bearing at a second depth relative to the air bearing pads, the second depth being substantially greater than the first depth; and a gap formed at the second depth between the leading edge air bearing pads that extends from the deep pocket to the leading edge of the base, the gap having a transverse dimension that is less than a transverse dimension of the leading edge pads.

2. The head of claim 1 wherein the gap is also located between two of the shallow pockets.

3. The head of claim 1 wherein a trailing end of the trailing edge pad extends from one of the shallow pockets.

4. The head of claim 1 wherein the leading edge air bearing pads abut two of the shallow pockets and the deep pocket, and wherein the gap separates the leading edge air bearing pads and their associated shallow pockets from each other.

5. The head of claim 1 wherein two of the shallow pockets abut the leading edge of the base.

6. The head of claim 1 wherein each of the air bearing pads has a perimeter formed from at least eight sides.

7. The head of claim 6 wherein one of the air bearing pads has a perimeter formed from at least ten sides.

8. The head of claim 1 wherein one of the shallow pockets extends from the deep pocket and is free of contact with the air bearing pads.

9. The head of claim 8 wherein said one of the shallow pockets is located adjacent to the trailing edge and one of the lateral edges of the base.

10. A magnetic head for reading and writing to a surface of a rotating magnetic disk, comprising:

a base having a first side and an opposite second side, the first side having a leading edge, a trailing edge, and two lateral edges extending therebetween;

an air bearing formed on the first side of the base; the air bearing comprising:

two leading air bearing pads extending from the air bearing adjacent to the leading edge of the base;

a trailing air bearing pad extending from the air bearing adjacent to the trailing edge of the base;

at least five shallow pockets formed in the air bearing at a first depth relative to the air bearing pads;

a deep pocket formed in the air bearing that substantially surrounds the air bearing pads and the shallow pockets, the deep pocket being formed at a second depth relative to the air bearing pads that is substantially greater than the first depth; and a gap formed at the second depth between the leading air bearing pads and two of the shallow pockets, the gap extending from the deep pocket to the leading edge of the base and having a transverse dimension that is less than a transverse dimension of the leading air bearing pads and the shallow pockets.

11. The head of claim 10 wherein two of the shallow pockets abut the leading edge of the base.

12. The head of claim 10 wherein each of the air bearing pads has a perimeter with at least eight sides, and each of the shallow pockets has a perimeter with at least four sides.

13. The head of claim 10 wherein one of the air bearing pads has a perimeter with at least ten sides.

14. The head of claim 10 wherein one of the shallow pockets extends from the deep pocket and is free of contact with the air bearing pads.

15. The head of claim 14 wherein said one of the shallow pockets is located adjacent to the trailing edge and one of the lateral edges of the base.

16. A device for reading and writing to recording media, comprising:

a disk having a surface with a plurality of tracks;

an actuator with a movable arm and a suspension on one end that is movable relative to the recording media for accessing the tracks;

a load/unload mechanism located adjacent to the disk for engaging the actuator;

a head mounted to the suspension for reading and writing to a surface of the recording media; the head comprising:

a base having a first side and an opposite second side, the first side having a leading edge, a trailing edge, and two lateral edges extending therebetween;

an air bearing formed on the first side of the base that is both longitudinally and laterally asymmetric; the air bearing comprising:

three air bearing pads extending therefrom;

a plurality of shallow pockets formed in the air bearing at a first depth relative to the air bearing pads;

a deep pocket formed in the air bearing at a second depth relative to the air bearing pads, the second depth being substantially greater than the first depth; and a gap formed at the second depth between two of the air bearing pads that extends from the deep pocket to the leading edge of the base, the gap having a transverse dimension that is less than a transverse dimension of the air bearing pads.

17. The device of claim 16 wherein the gap is also located between two of the shallow pockets.

18. The device of claim 16 wherein a third one of the air bearing pads is located adjacent to the trailing edge of the base.

19. The device of claim 18 wherein a trailing end of the third one of the air bearing pads extends from one of the shallow pockets.

20. The device of claim 16 wherein each of said two of the air bearing pads abuts two of the shallow pockets and the deep pocket, and wherein the gap separates said two of the air bearing pads and their associated shallow pockets from each other.

21. The device of claim 16 wherein two of the shallow pockets abut the leading edge of the base.

22. The device of claim 16 wherein each of the air bearing pads has a perimeter formed from at least eight sides.

23. The device of claim 22 wherein one of the air bearing pads has a perimeter formed from at least ten sides.

24. The device of claim 16 wherein one of the shallow pockets extends from the deep pocket and is free of contact with the air bearing pads.

25. The device of claim 24 wherein said one of the shallow pockets is located adjacent to the trailing edge and one of the lateral edges of the base.

* * * * *